United States Patent [19]

Berman

[11] Patent Number: 5,055,918
[45] Date of Patent: Oct. 8, 1991

[54] PIXEL IMAGE ENHANCER

[76] Inventor: Robert A. Berman, 27237 Paula La., Conroe, Tex. 77385

[21] Appl. No.: 516,471

[22] Filed: Apr. 30, 1990

[51] Int. Cl.⁵ .............................................. H04N 9/74
[52] U.S. Cl. ....................................... 358/22; 358/39; 358/182; 340/729; 382/22
[58] Field of Search ................... 358/22, 182, 183, 31, 358/39; 340/729, 730, 723; 382/22, 27, 54

[56] References Cited

U.S. PATENT DOCUMENTS

| | | | |
|---|---|---|---|
| T912,012 | 7/1973 | Appel | 340/729 |
| 3,441,789 | 4/1969 | Harrison | 340/729 |
| 3,989,888 | 11/1976 | Busch | 358/182 |
| 4,041,527 | 8/1977 | Rayner | 358/22 CK |
| 4,186,393 | 1/1980 | Leventer | 340/729 |
| 4,410,908 | 10/1983 | Belmares-Sarabia | 358/30 |
| 4,538,144 | 8/1985 | Yamagami | 340/729 |
| 4,590,465 | 5/1986 | Fuchs | 340/723 |
| 4,698,666 | 10/1987 | Lake, Jr. | 340/730 |
| 4,727,364 | 2/1988 | Vorst | 340/729 |
| 4,847,607 | 7/1989 | Schoon | 340/730 |
| 4,853,970 | 8/1989 | Ott | 382/54 |

OTHER PUBLICATIONS

AutoDesk brochure, AutoShade program description, 1989.

Primary Examiner—Tommy P. Chin
Attorney, Agent, or Firm—William A. Knox

[57] ABSTRACT

A simple hardware module for insertion between a source of video signals such as a graphics computer or a VCR, and a video display device such as a TV monitor, for applying a shading effect to two-dimensional graphics for the purpose of simulating a depth of field around the resulting video image.

9 Claims, 4 Drawing Sheets

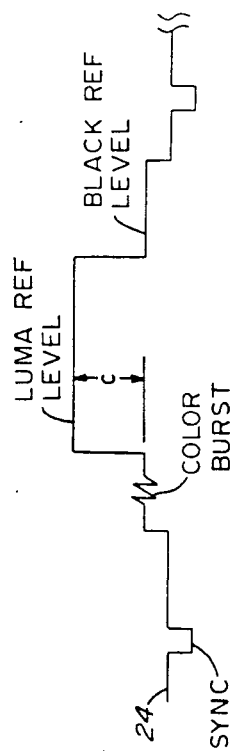
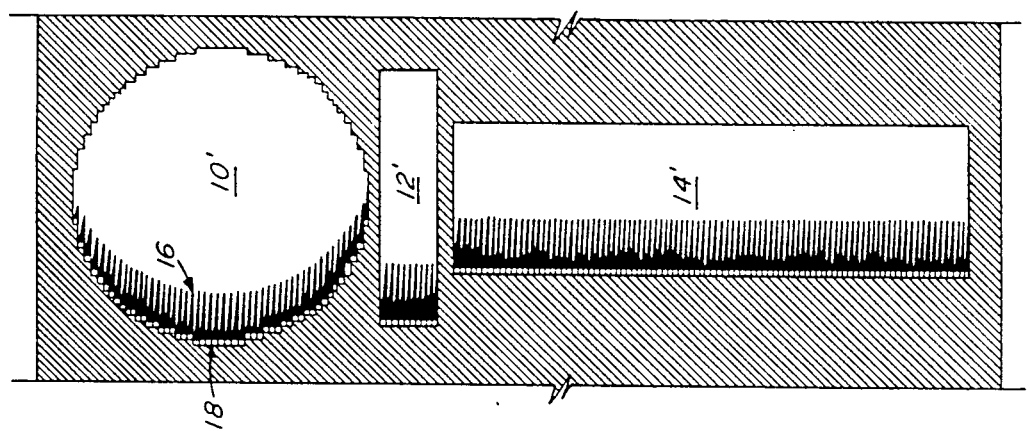
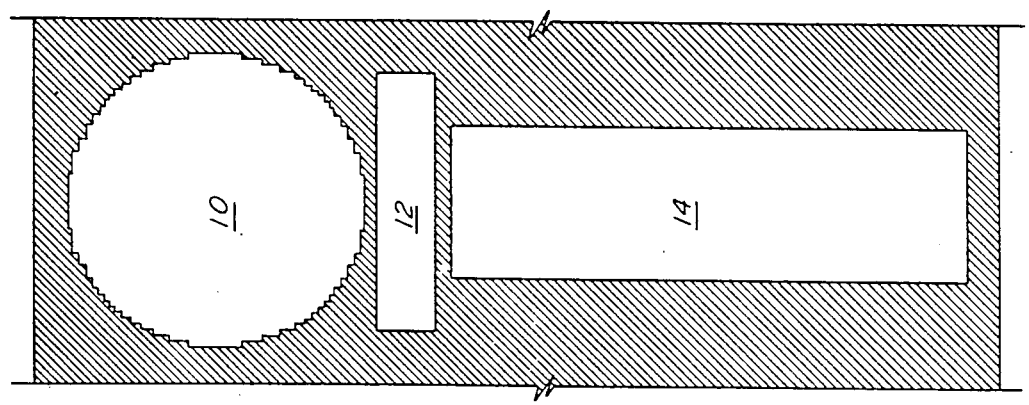

PIXEL IMAGE ENHANCER

BACKGROUND OF THE INVENTION

2. Field of the Invention

This invention relates to a simple hardware module that may be coupled between a source of video signals and a video monitor, for modifying the gray scale of selected portions of a two-dimensional video image.

2. Discussion of the Prior Art

There are sophisticated computer programs that produce graphics that are characterized by representations of plane or curved surfaces in the apparent spatial relations as they would appear to the eye. That is, the image graphics give the appearance of depth in three dimensions by applying the principles of artistic perspective. Such programs typically require massive amounts of memory far beyond the capabilities of modest-sized personal computers. One such program, AutoShade ®, provided by Autodesk of Sausalito, Calif., requires about 350 kb of RAM.

Another such system is taught by U.S. Pat. No. 4,410,908, issued 10/18/83 to Belmares-Sarabia et al. for a Luminance Signal Generator for a Color Film Scanner. Another teaching of interest is U.S. Pat. No. 4,590,465, issued 05/20/86 to Henry Fuchs for a Graphics Display System Using Logic Enhanced Pixel Memory Cells. A third system is exemplified by U.S. Pat. No. 4,853,970, issued 08/01/89 to David and Cynthia Ott for an Apparatus for Processing Digitized Images. All of those references require complicated circuitry and internal programming steps that, while suitable for studio-type processing, are far too complex for a personal computer of limited capacity.

In applications such as video games, computer-aided design applications and computer simulations, the images are presented as simple two-dimensional displays because it would be uneconomical program-wise and cost-wise, to attempt a more aesthetic presentation.

It is the object of this invention to provide a simple means and method for inexpensively, in terms of both memory and disk space as well as in terms of money, imparting a simulated depth of field to displayed two-dimensional video images as provided by a source of video signals such as a graphics computer or a VCR.

SUMMARY OF THE INVENTION

In accordance with an aspect of the invention, I provide a means and method for simulating a depth of field for a displayed two-dimensional video image by receiving video output-signal components from a source of video signals. The components are decoded to form corresponding chroma and luma signals. The chroma and luma signals are, of course, each characterized by a leading and a trailing edge. The signal levels or luminosity values of the leading edges of the luma signals are modulated as a function of time over a preselected time interval. The chroma and modulated luma signals are combined to form composite signals. The composite signals are transmitted to a video display device to provide shaded two dimensional video images.

In accordance with as aspect of this invention, a shading terminator is defined relative to an edge of the shaded two-dimensional image. The shading terminator is positioned within the confines of the image by adjusting the length of the preselected function of time which may be exponential.

In accordance with another aspect of this invention, the shading softness of the shaded portion of the image is adjusted by controlling the rise time of the leading edges of the modulated luma signals in accordance with the preselected function of time.

Means are provided for regulating the contrast between the shaded and the unshaded portions of a two-dimensional video image.

BRIEF DESCRIPTION OF THE DRAWINGS

These and other aspects of this invention will be better understood by reference to the appended detailed description of the preferred embodiment and the drawings, wherein:

FIG. 1 is a display of an unshaded two-dimensional video image;

FIG. 2 is a display of a shaded two-dimensional video image;

FIG. 4a illustrates an unmodulated luma signal;

FIG. 4b illustrates a luma signal modulated according to a first preselected function of time;

FIG. 4c shows a luma signal modulated according to a second preselected function of time.

DETAILED DESCRIPTION OF THE PREFERRED EMBODIMENT

Figure 3:
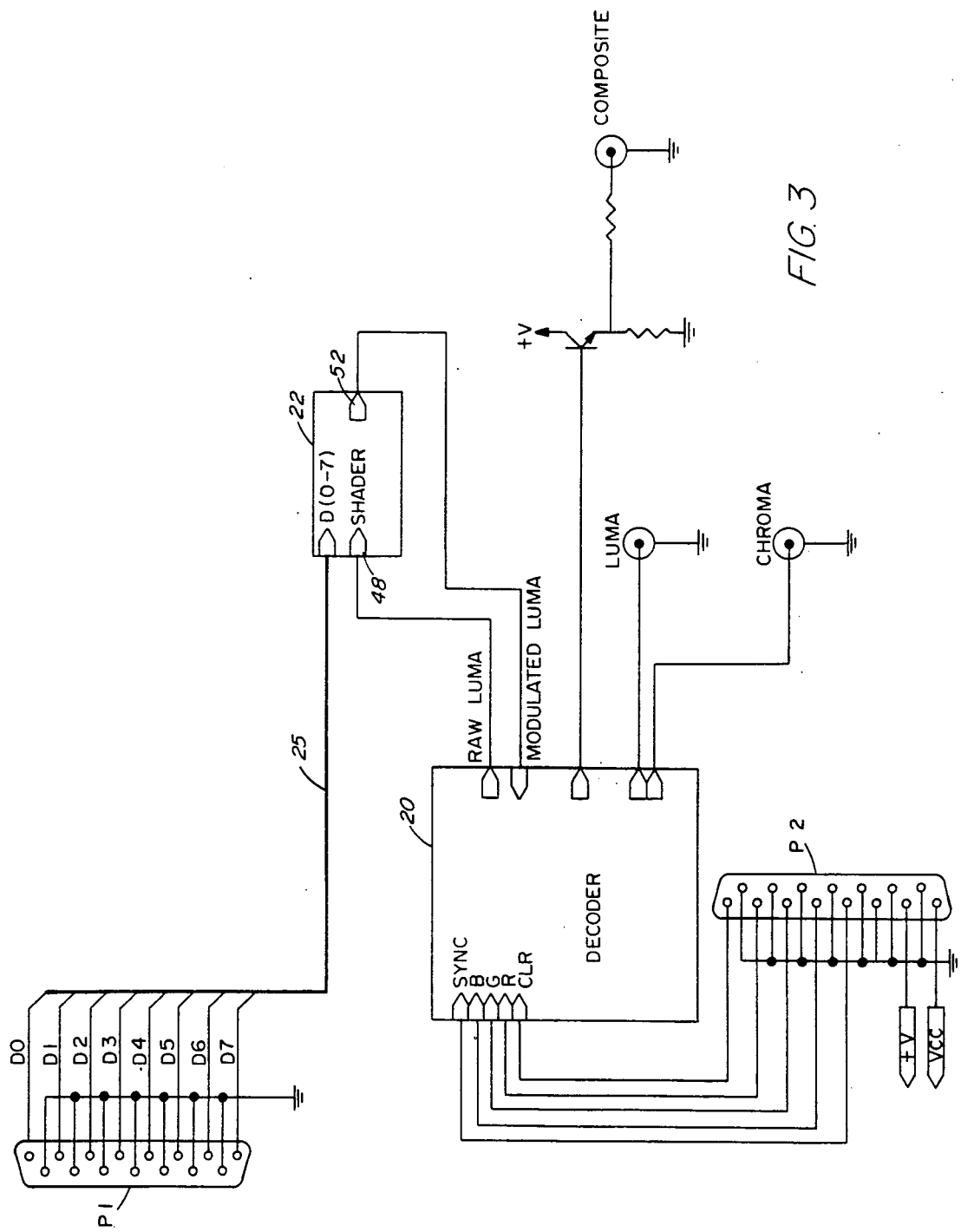
FIG. 3 is a block diagram of the overall system.

FIG. 1 shows a two dimensional video image of a disk 10, atop a narrow elongated rectangle 12 which is in turn positioned above a long narrow rectangle 14 against a dark video background. In FIG. 2, the images have been shaded in accordance with this invention, to simulate a sphere 10' mounted on top of a thin circular plate 12' which rests on a cylindrical column 14'. With respect to sphere 10', a shading terminator 16, relative to an edge 18 of the video image is defined. The shading terminator is positioned within the confines of the two-dimensional video image 10' by means that will be explained later in connection with FIG. 5a and 5b. Similarly, shading terminators are defined for plate 12' and cylinder 14'. The shading softness, that is, the contrast between the shaded and the unshaded portions of the image may also be adjusted as desired.

FIG. 3 is a block diagram of the overall system. Plug P2 outputs the baseband signal components clock, sync, and red, green, blue (RGB) signals from a source of video signals such as a computer or a VCR by way of example but not by way of limitation. The components are fed to a Color Television RGB to PAL/NTSC encoder 20 such as the Motorola MC1377 integrated circuit. The decoded signal components emerge from encoder 20 as separate luma and chroma signals. The luma and chroma signals may be combined to form the composite signal.

The chroma (chrominance) signal is that part of the video signal which provides the color information for the image on a TV video monitor screen. The luma (luminance) signal is the component of the video signal that provides the intensity information for the image on the video monitor screen. In this invention, the luma signal is sent to a shader circuit module 22 where it is modulated by loading the luma signal with various amounts of capacitance and resistance. The loading could be selected manually by use of DIP switches on lines D0–D7, however, I prefer to regulate the capacitance and resistance values under computer control by use of a simple driver program of any desired type that may be entered from a keyboard. To that end, control signals are sent from a device such as a computer via either a parallel or a serial port (depending on the type of device) through plug P1 over the lines D0–D7 as will be described under FIG. 5. The modulated luma signal is returned to encoder 20 where it is combined with the chroma signal to provide a NTSC (National Television Systems Committee) composite video signal which is transmitted to a video display device. The chroma and luma signals may also be sent out separately. It is to be understood that the MC1377 encoder, in and of itself, forms no part of this invention except in combination with the shader circuit 22.

FIG. 4a is a grossly simplified snap shot 24 of the amplitude excursions of the leading edge of the luma portion of a composite video signal during the course of one scan as it paints a portion of a two-dimensional video image. Following the sync pulse and color burst, during that portion of a scan where a two dimensional image appears, the luma signal rises to a reference level of luminosity, c, in accordance with a contrast setting and remains at that level for a time interval equal to the width of the image as measured in terms of pixel time units. Thereafter, the luma signal drops back to the black reference level. From FIG. 4a, it is apparent that, due to the abrupt rise-time of the unmodulated luma signal, the video image will be stark white against a dark or black background as shown in FIG. 1.

As before mentioned, the shader circuit 22 loads the luma signal with capacitance and resistance having preselected values. In FIG. 4b, the RC parameters are chosen to produce a preselected time constant of tc1. Over that time interval, the luminosity level of the luma signal snap shot 24a slowly rises from black reference level to full luminosity. The effect of the slow rise is to create a gradual change in luminosity to provide a shading effect relative to one edge of the two dimensional video image as in FIG. 2.

In FIG. 4c, different RC parameters are selected to change both the rise time of the leading edge of the luma signal snap shot 24c as well as the preselected time constant, tc2. A slower rise time over a longer time interval will produce a softer shading. The position of the terminator 16 within the confines of the shaded two dimensional image 10', as shown in FIG. 2 is a function of the length of the time constant, tc1 or tc2, that is preselected.

Figure 5A:
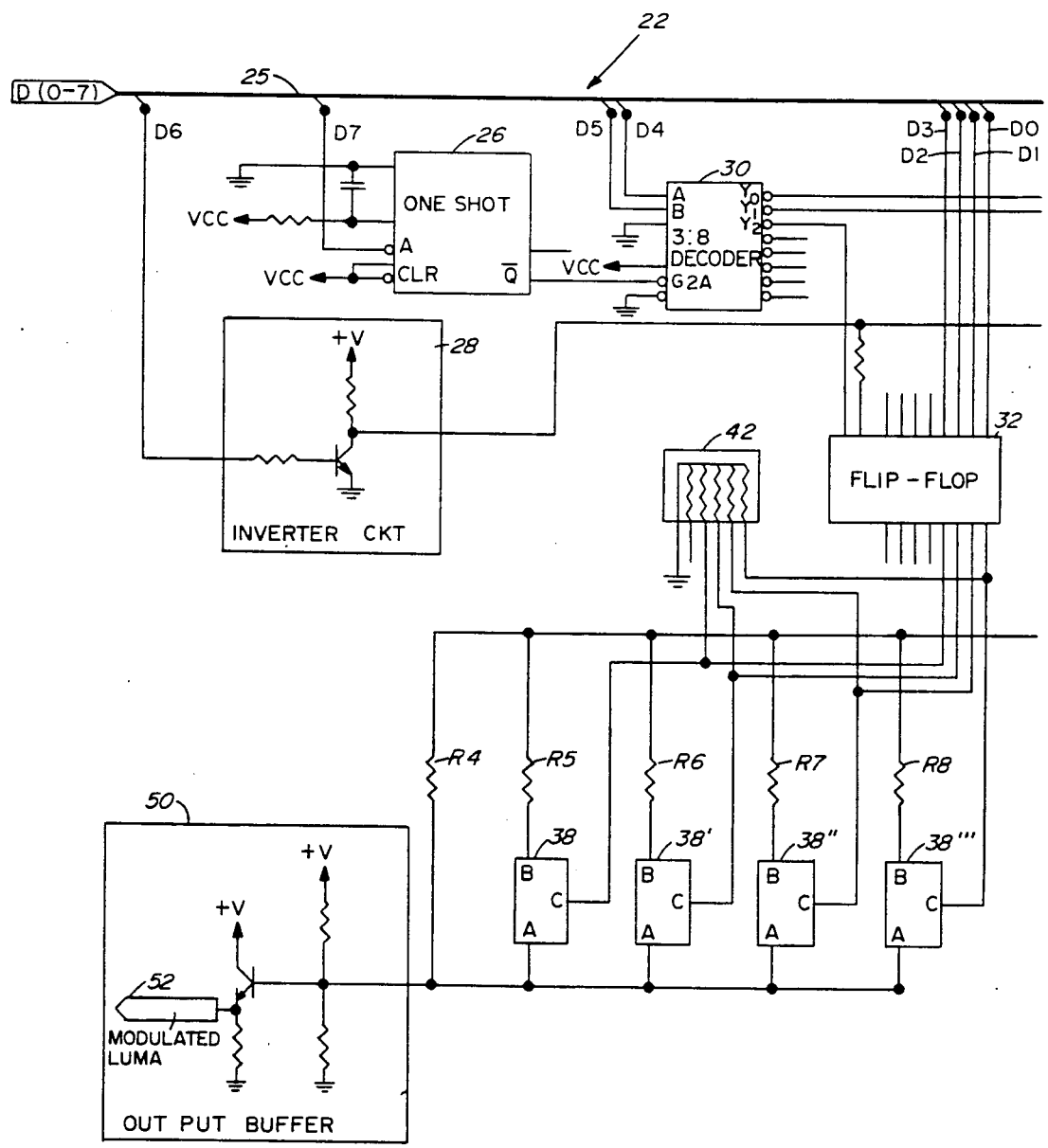
FIGS. 5a and 5b are the left and right halves respectively of a schematic diagram of the shader circuit of this invention.
Figure 5B:
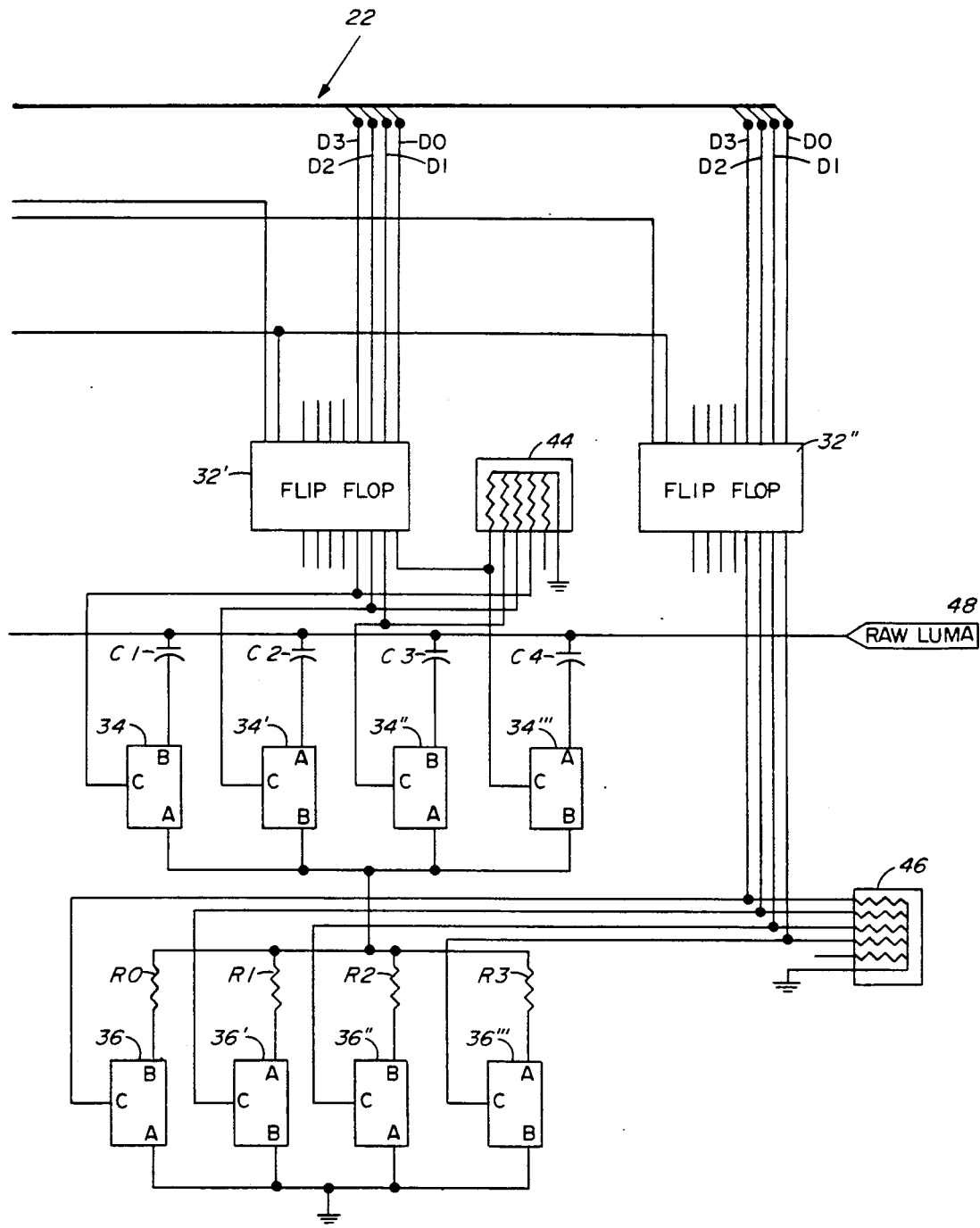

FIG. 5a and 5b are the left an right halves of a schematic diagram of the shader circuit 22 of this invention. Cable 25 from plug P1 of FIG. 3 includes command lines D0–D7 over which are sent binary signals for controlling shader circuit operation. D5 is a reset or enable line; circuitry 28 simply sets the enable pulse to the proper polarity. Line D7 applies a clock pulse to dual retriggerable one-shot 26 which acts as a latch. One-shot 26 is a DM74LS123 chip made by National Semiconductor Corporation (NSC). The output from one-shot 26 triggers 3:8 decoder 30, which triggered flip-flops 32–32″, which are DM74LS374 chips made by NSC, in accordance with a two-bit binary code received over lines D4 and D5. Each of the three flip-flops 32–32″ control one set of four bilateral switches 34–34‴, 36–36‴ and 38–38‴ respectively according to the bit pattern set on lines D0–D3. The bilateral switches are CD4016 devices also made by NSC. Since the four lines D0–D3 are common to all of the flip-flops, each of the three flip-flops 32, 32′ and 32″ must be set up separately. Resistor packs 42, 44, 46 are 1K pull-up resistors.

Capacitors C1–C4 have exemplary values of 0.1, 0.047, 0.022 and 0.010 μF respectively. One or more capacitors may be selected in accordance with the code entered in flip-flop 32′. One or more resistors R0–R3 are chosen in accordance with the code set into flip-flop 32″. Resistors R0–R3 have exemplary values of 0 0, 22.0, 47.0 and 82.0Ω respectively. The capacitors and resistors taken together form an RC circuit for loading the luma signal as previously discussed. The capacitors provide means for positioning the shading terminator within the confines of the two dimensional video image by adjusting the length of a preselected time interval. The resistors furnish means for adjusting the shading softness of the shaded portion of the shaded video image by regulating the rise time of the leading edge of the modulated luma signal. The two functions are, of course, interdependent.

Resistors R4–R8 are series resistors for providing means for selecting the contrast between shaded and unshaded portions of a two-dimensional video image. The value of the series resistance is selected through one or more of the bilateral switches 38–38‴ as defined by the code set in flip-flop 32. Exemplary values for the resistors are 1500, 750, 470, 220 and 100Ω.

In my presently preferred mode of operation, under program control, flip-flop 32′ and its associated bilateral switches are encoded to define the desired position of the shading terminator within the confines of a two dimensional image to be generated. The shading softness and contrast for the image is determined by the coding set into flip-flops 32″ and 32 respectively which control their associated bilateral switches as explained supra.

The luma signal from the luma output of decoder 20, FIG. 3, is injected into shader circuit 22 at the luma input 48, FIG. 5. The luma signal is modulated as a function of time over a preselected time interval in accordance with the parameters set into the RC portion of shader circuit 22 and by the contrast controls. Preferably, the preselected function of time is an exponential function. The modulated luma signal appears at luma output terminal 52 after passing through buffer circuit 50. The modulated luma signal is returned to the luma input of decoder 20, FIG. 3, where it is combined with the chroma signal to form a composite signal that may be sent to a video display device.

My invention has been described with a certain degree of specificity and is exemplary only. For example, the resistor and capacitance values may be altered by those skilled in the art to suit their specific needs. In this example, the preselected function of time is exponential but other time functions could be used, although at the expense of a more complicated circuit. The block diagram of FIG. 3 is essentially an interface between a source of video signals and the shader module 22. Those skilled in the art might choose to select components other than those cited herein to tailor the interface to a particular video signal source, but which would be encompassed by the scope and spirit of the invention which is limited only by the appended claims.

I claim as my invention:

1. In a video display system, a method for simulating a depth of field in a two-dimensional video image, comprising:

receiving video output signal components from a source of video signals and encoding said video output signal components as corresponding chroma and luma signals which define a two dimensional video image, said luma signal being characterized by a leading and a trailing edge;

modulating the signal level, relative to a black-reference signal level, of the leading edge of said luma signal as a function of time over a preselected time interval;

combining the chroma and modulated luma signals to form composite signals; and transmitting the composite signals to a video display device to provide a shaded two dimensional video image.

2. The method of claim 1, further comprising:

defining a shading terminator relative to an edge of a shaded two dimensional video image;

positioning said shading terminator within the confines of said shaded two dimensional video image by regulating the length of said preselected time interval.

3. The method of claim 2, comprising:

adjusting the shading softness of the shaded portion of the shaded two dimensional video image by regulating the rise time of the leading edges of the modulated luma signals in accordance with the preselected function of time.

4. The method as defined by claim 1, wherein: the shading intensity of said shaded two dimensional video image decreases from left to right, horizontally.

5. The method as defined by claim 3, wherein: said preselected function of time is exponential.

6. A system for simulating a depth of field in a display of a two-dimensional video image, comprising:

means for receiving video output signal components including at least a clock pulse, a sync pulse and RGB signals, from a source of video signals;

means for encoding said signal components as corresponding chroma and luma signals, the chroma and luma signals being characterized by leading and trailing edges;

means for modulating the level of the leading edges of the luma signals relative to a black reference level in accordance with a preselected function of time;

means for combining said chroma signals with the modulated luma signals to form composite signals; and means for transmitting the composite signals to a video display device to provide a shaded two dimensional video image.

7. The system as defined by claim 6, wherein: said preselected function of time is exponential.

8. The system as defined by claim 6, comprising:

means for regulating the length of said preselected function of time to position a shading terminator within the confines of the displayed shaded two dimensional video image and to define the shading softness.

9. The system as defined by claim 8, comprising:

means for adjusting the contrast between shaded and unshaded portions of the displayed shaded two-dimensional video image.

* * * * *